(12) United States Patent
Saha (10) Patent No.: US 7,729,368 B2
(45) Date of Patent: Jun. 1, 2010

(54) NETWORK BUFFER CACHING

(75) Inventor: Rakesh Saha, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 408 days.

(21) Appl. No.: 11/655,581

(22) Filed: Jan. 19, 2007

(65) Prior Publication Data

US 2008/0175258 A1 Jul. 24, 2008

(51) Int. Cl.
*H04L 12/56* (2006.01)
(52) U.S. Cl. .................. 370/412; 370/252; 370/414; 370/417; 709/207; 709/209; 709/228
(58) Field of Classification Search .............. 370/395.7, 370/395.71, 395.72, 252, 412, 469, 392.7; 709/213–217, 203, 206, 209, 228
See application file for complete search history.

(56) References Cited

U.S. PATENT DOCUMENTS

| | | | |
|---|---|---|---|
| 5,717,932 A | 2/1998 | Szczepanek et al. | |
| 5,933,413 A | 8/1999 | Merchant et al. | |
| 6,181,705 B1 | 1/2001 | Branstad et al. | |
| 6,289,390 B1 * | 9/2001 | Kavner | 719/310 |
| 6,701,372 B2 | 3/2004 | Yano et al. | |
| 6,801,927 B1 * | 10/2004 | Smith et al. | 709/202 |
| 6,952,407 B2 | 10/2005 | Burke | |
| 6,959,327 B1 | 10/2005 | Vogl et al. | |
| 2002/0038309 A1 * | 3/2002 | Perkins et al. | 707/104.1 |
| 2004/0032936 A1 * | 2/2004 | Horel et al. | 379/114.03 |
| 2004/0039550 A1 * | 2/2004 | Myers | 702/186 |
| 2005/0080874 A1 * | 4/2005 | Fujiwara et al. | 709/217 |
| 2007/0133582 A1 * | 6/2007 | Banerjee et al. | 370/412 |

* cited by examiner

*Primary Examiner*—Pankaj Kumar
*Assistant Examiner*—Anez Ebrahim (57) ABSTRACT

One embodiment relates to a method of processing packets by a network stack. A first data packet is received from a client via a network, and a network buffer is allocated for the data packet. An indication is given that the data packet is ready for reading by an application. In addition, the network buffer is cached in a network buffer cache. Subsequently, response data may be received from the application, and the network buffer may be re-used from the network buffer cache. The response data may be sent in a second data packet to the client via the network. Finally, the network buffer may be freed. Other embodiments, aspects, and features are also disclosed.

18 Claims, 9 Drawing Sheets

FIG. 1
(Conventional)

FIG. 2
(Conventional)

FIG. 3
(Conventional)

NETWORK BUFFER CACHING

BACKGROUND

1. Field of the Invention

The present application relates generally to computer systems and data networking.

2. Description of the Background Art

Packets of data are transmitted over a network communication system between a server and client devices. These packets are received by a network interface and processed by the network stack at the server.

It is desirable for the network stack to operate efficiently and have a high rate of data transfer. The operational performance of the network stack is largely determined by the performance of network interface's hardware circuitry and software code.

SUMMARY

One embodiment relates to a method of processing packets by a network stack. A first data packet is received from a client via a network, and a network buffer is allocated for the data packet. An indication is given that the data packet is ready for reading by an application. In addition, the network buffer is cached in a network buffer cache. Subsequently, response data may be received from the application, and the network buffer may be re-used from the network buffer cache. The response data may be sent in a second data packet to the client via the network. Finally, the network buffer may be freed.

Other embodiments, aspects, and features are also disclosed.

DETAILED DESCRIPTION

Applicant has discovered a problematic source of substantial inefficiency in at least some conventional network interfaces. Applicant has further found a solution to this problem which results in substantial performance improvement. The solution advantageously improves performance of transaction-based network applications, with minimal or negligible impact on bulk data transfers.

Conventional Network Interfaces

Figure 1:
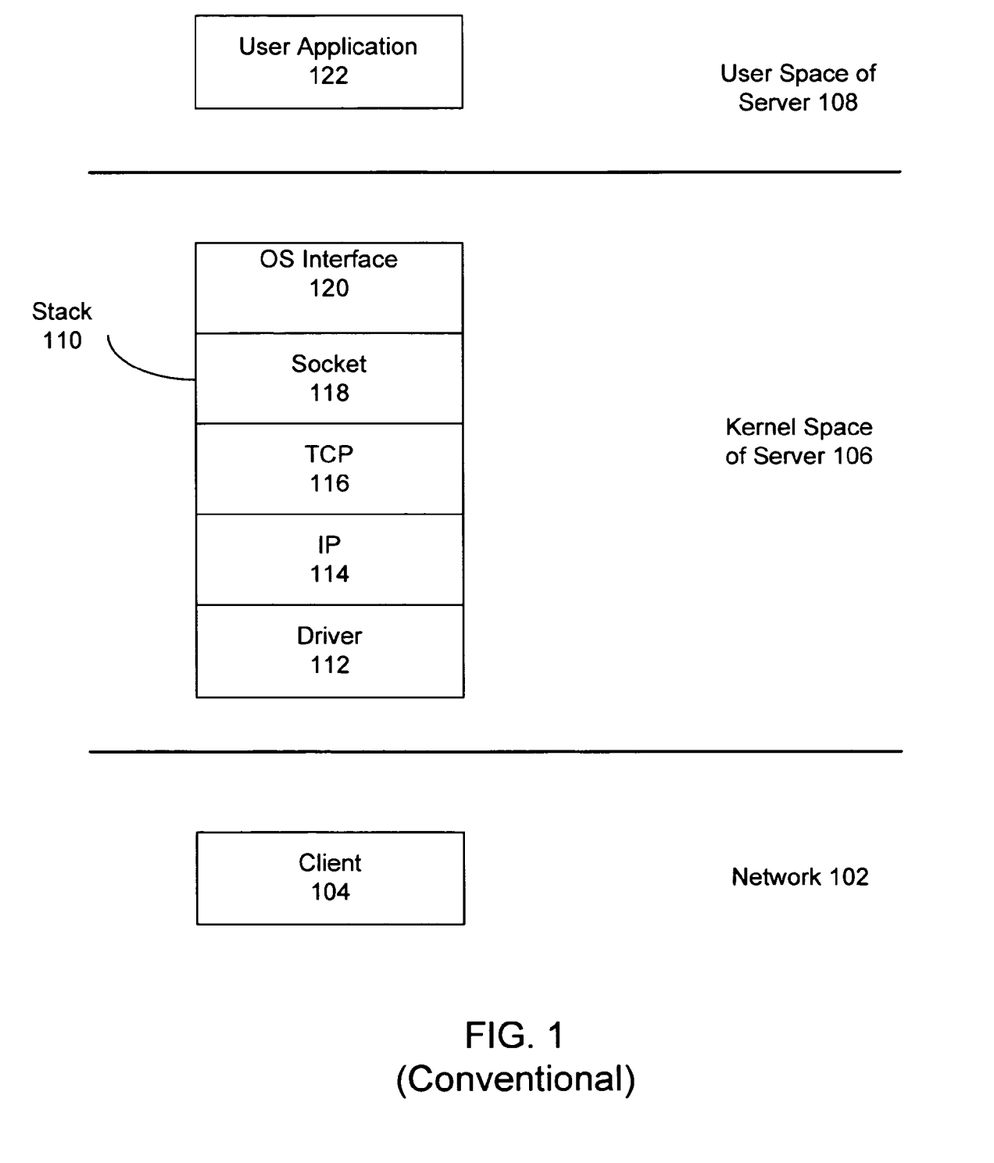
FIG. 1 is a schematic diagram depicting select components of a network stack of a server.

FIG. 1 is a schematic diagram depicting select components of a network interface of a server. A client computer 104 is shown as communicatively coupled to the server by way of a network 102. The server connects to the network 102 by way of a network interface.

The diagram divides various software-implemented components of the server into kernel space 106 and user space 108. Software components which manage the server system's resources and the communication between hardware and software components are generally run in kernel space 106, while user applications are generally run in user space 108.

In FIG. 1, a TCP/IP stack 110 is depicted in kernel space 106. As shown, the TCP/IP stack 110 includes a device driver 112, an internet protocol (IP) layer 114, a transmission control protocol (TCP) layer 116, a socket layer 118, and an operating system (OS) interface 120. A user application 122 is shown in the user space 108. These various components may include processor-readable code which is executable to perform various operations and functions.

While a single client 104 is illustrated in FIG. 1, a typical transaction-based application may have multiple clients connected to a single server. Each client 104 sends requests to the server, and the server typically responds to each request as quickly as possible.

The response time witnessed by each client 104 for its request, and the number of simultaneous requests that may be supported by the server depends, on among other factors, the speed at which the networking subsystem processes the incoming and outgoing packets.

Figure 2:
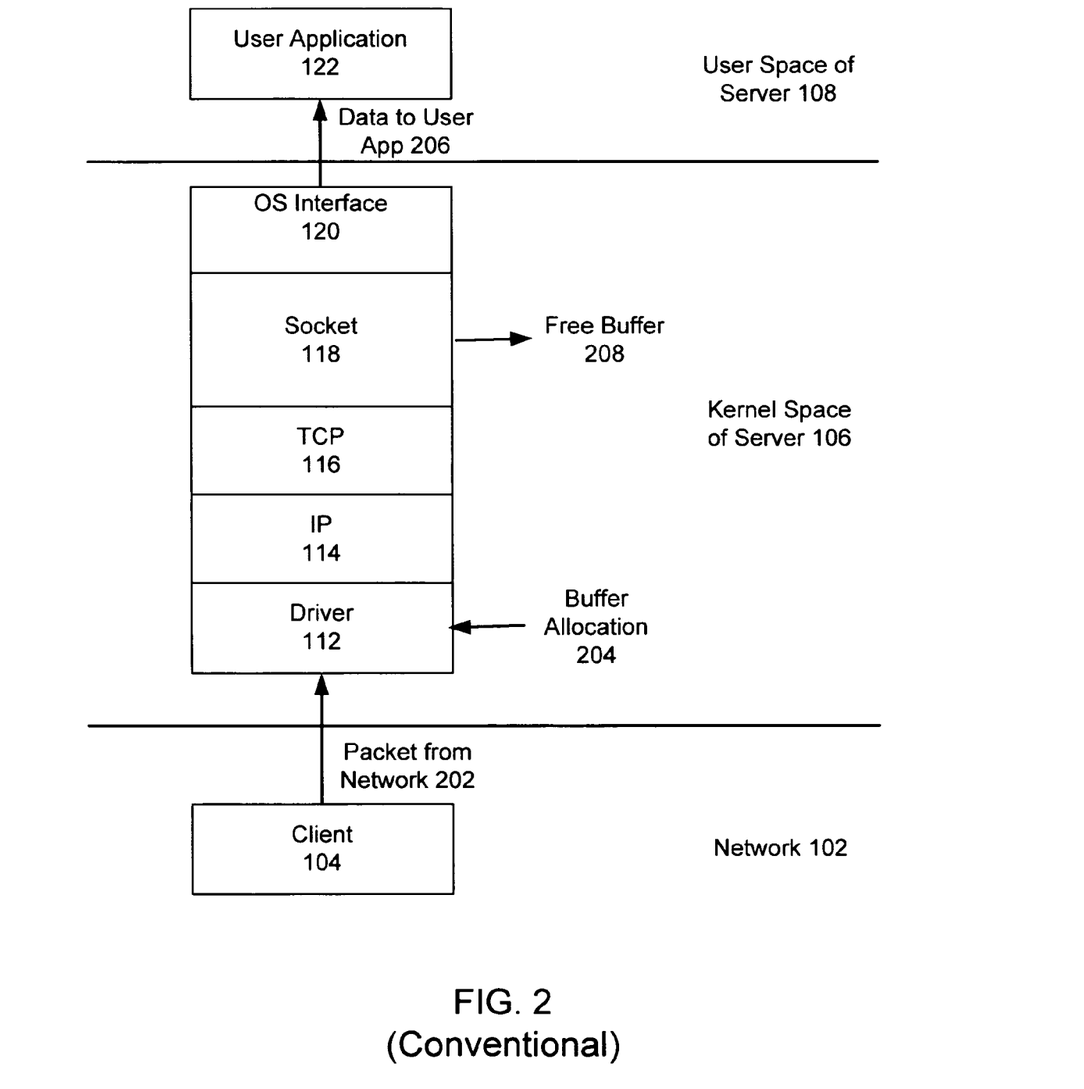
FIG. 2 is a schematic diagram depicting the conventional processing of a data packet received from a client by the network interface.

FIG. 2 is a schematic diagram depicting the conventional processing of a data packet received from a client by the network interface. In other words, FIG. 2 shows processing steps in the inbound (receive) path.

As shown, a data packet from a client 104 in the network 102 arrives 202 at the network interface. The data packet is received by the driver 112 for the network interface and deposited in the system memory. As the packet is processed by the stack 110, it conceptually moves up in the stack 110 from the driver 112, to the IP layer 114, to the TCP layer 116, to the socket layer 118, to the OS interface 120.

A network buffer is allocated 204 by the networking subsystem to copy the packet for further network processing. As shown, the buffer allocation 204 in the incoming path is typically performed by the driver layer 112. Thereafter, the packet in the buffer is further processed by the networking subsystem, and the user application is then given an indication that the packet is ready for it to read. The user application then reads 206 the data in the packet.

When the network buffer is no longer needed, the network subsystem frees 208 the allocated buffer. As shown, the freeing 208 of the buffer is typically performed by the socket layer 118. After being freed, the buffer memory is available to be re-allocated for processing other incoming or outgoing data.

Upon reading the request contained in the packet, the user application 112 may satisfy the request by sending the requested data. The data is accepted by the network subsystem and is processed as described below.

Figure 3:
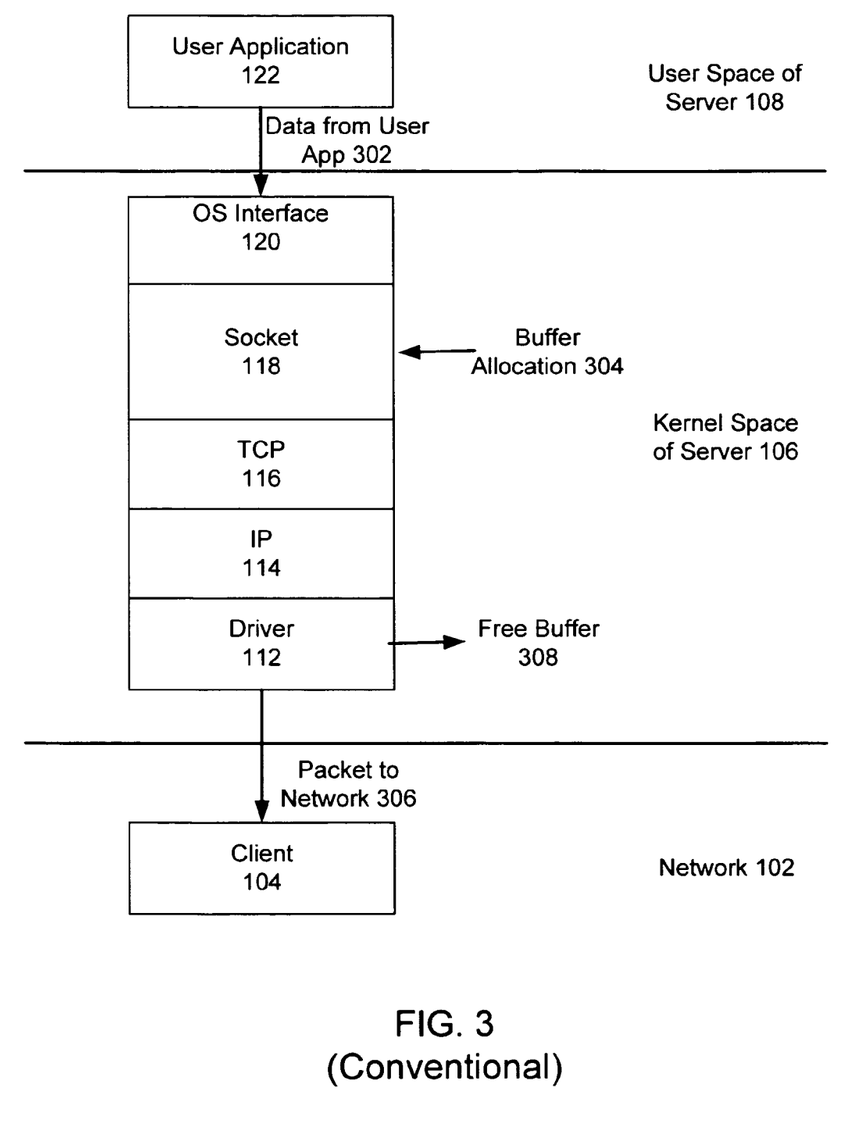
FIG. 3 is a schematic diagram depicting the conventional processing of data received from a user application by the network interface.

FIG. 3 is a schematic diagram depicting select steps in the conventional processing of data received from a user application by the network interface. In other words, FIG. 3 shows processing steps in the outbound (send) path.

As shown, user data from an application 122 in user space 108 of the server is received 302 at the top of the stack 110 by the OS interface 120. As the user data is processed by the stack 110, it conceptually moves down in the stack from the OS interface 120, to the socket layer 118, to the TCP layer 116, to the IP layer 114, and to the driver 112.

As the user data is processed, a network buffer is allocated 304 by the networking subsystem to copy the user data for further network processing. As shown, the buffer allocation 304 in the outgoing path is typically performed by the socket layer 118. Thereafter, the user data in the buffer is further processed by the networking subsystem and is then sent 306 to the driver 112 of the network interface for transfer in a data packet via the network 102 to the client 104.

When the network buffer is no longer needed, the network subsystem frees 308 the allocated buffer. As shown, the freeing 308 of the buffer in the outgoing path is typically performed by the Driver layer 112. After being freed, the buffer memory is available to be re-allocated for processing other incoming or outgoing data.

Problematic Inefficiency in Conventional Network Interfaces

The above-described conventional processes for the inbound and outbound paths make sense in general and are usable for different types of network traffic. However, applicant has discovered a problematic inefficiency which often detrimentally affects performance. In particular, the inefficiency substantially reduces performance for transaction-based network traffic.

The inefficiency identified herein pertains to the allocation and freeing of the network buffers. Conventionally, it makes sense that, at the end of each individual inbound or outbound process, the allocated buffer would be immediately freed to make the buffer available for re-allocation. For example, in the case of bulk data transfers (either inbound or outbound), such immediate freeing of network buffers leads to good performance.

However, applicant has discovered that, for transaction-based network traffic, the repeated allocation and freeing of the network buffers is a substantial source of inefficiency and reduced performance. Each allocation or freeing of a network buffer utilizes valuable CPU time. Hence, it is desirable to reduce the frequency of network buffer allocation/freeing so as to improve performance.

Solution for Improved Performance

Applicant has found a technique that reduces the frequency of network buffer allocation/freeing operations by up to a half (up to 50%) for transaction-based network traffic. The technique takes advantage of the following observations. First, in a transaction-based network application (for example, a web server, SAP, billing applications for telecommunications, and so on), a receive (or send) is followed by a send (or receive) iteratively for the life of a typical network connection. Second, a typical transaction (i.e. a typical send/receive or receive/send pair) consists of a transfer of a relatively small number of bytes. For example, the traffic patterns of many applications (for example, SAP) show typical packet sizes of less than 1024 bytes.

In accordance with an embodiment of the invention, a substantial (up to 50%) reduction in buffer allocation/freeing operations for transaction-based applications may be accomplished by caching of the network buffers by the network subsystem. (Caching in the network subsystem is different from caching performed in the memory subsystem.) Advantageously, the caching of the network buffers may be implemented such that the performance for network-based traffic is improved without significantly affecting the performance for bulk data transfers.

Figure 4:
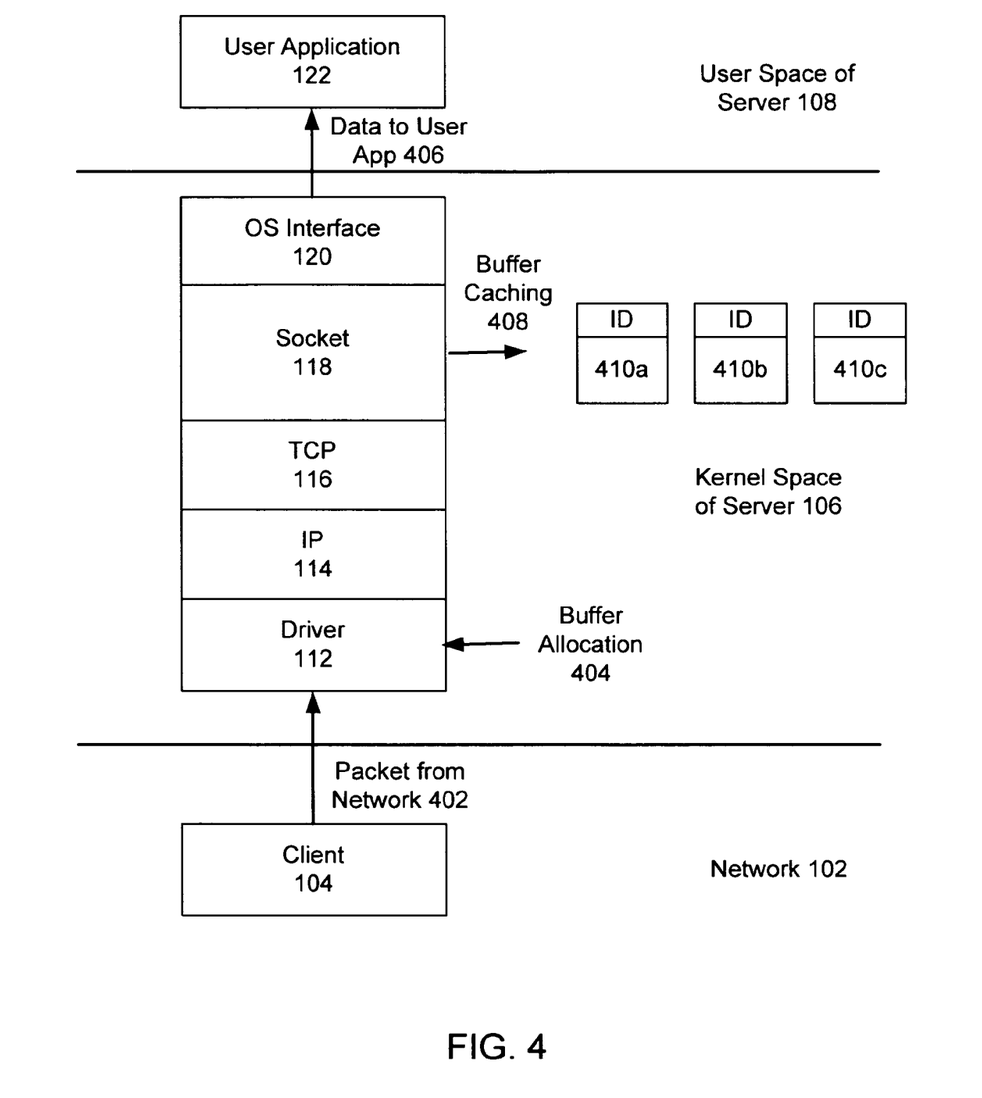
FIG. 4 is a schematic diagram depicting select steps in the processing of a data packet received from a client by the network stack in accordance with an embodiment of the invention.

FIG. 4 is a schematic diagram depicting select steps in the processing of a data packet received from a client by the network stack in accordance with an embodiment of the invention. In particular, FIG. 4 shows processing steps in the inbound (receive) path, wherein caching of network buffers is utilized to improve transaction-related performance.

As shown, a data packet from a client 104 in the network 102 arrives 402 at the network interface. The data packet is received by the driver 112 for the network interface and deposited in the system memory. As the packet is processed by the stack 110, it conceptually moves up in the stack 110 from the driver 112, to the IP layer 114, to the TCP layer 116, to the socket layer 118, to the OS interface 120.

A network buffer is allocated 404 by the networking subsystem to copy the packet for further network processing. As shown, the buffer allocation 404 in the incoming path may be performed by the driver layer 112. Thereafter, the packet in the buffer is further processed by the networking subsystem, and the user application is then given an indication that the packet is ready for it to read. The user application then reads 406 the data in the packet.

In the conventional process shown in FIG. 2, when the network buffer is no longer needed, the network subsystem frees 208 the memory that was previously allocated to the buffer. However, in accordance with the process of FIG. 4, the buffer is not freed. Instead, the buffer is cached 408 by the network subsystem. In other words, the memory previously allocated to the buffer remains allocated. This caching may be performed, for example, by the socket layer 118. In accordance with an embodiment of the invention, each memory buffer 410 in the cache is tagged or otherwise associated with a unique (or highly likely to be unique) transaction identifier (ID). For illustrative purposes, three network buffers (410a, 410b, and 410c) are shown in FIG. 4, each network buffer having an associated transaction identifier (ID).

The network buffer cache may be configured so as to be able to hold a limited number of network buffers, where each network buffer may be sized to be able to hold a typical data packet (sized at 1024 bytes, for example). For example, the network buffer cache may be configured to hold a maximum of 4, 8, 16, 32, or 64 network buffers. As the maximum number of buffers in the cache increases, the number of transactions which may be efficiently processed at a same time for a user application increases.

In accordance with a preferred implementation, if the network buffer cache is full when a network buffer is supposed to be cached 408, then that network buffer is freed, rather than cached. This feature advantageously prevents the network buffer cache from significantly affecting bulk data transfers. For example, an inbound bulk data transfer would result in the network buffer cache filling up with the first several packets of the data transfer. The remaining transferred packets may then be processed by allocating and then freeing (for re-allocation) a small number of network buffers.

Upon reading the request contained in the packet, the user application 112 may satisfy the request by sending the requested data. The data is accepted by the network subsystem and is processed as described below.

Figure 5:
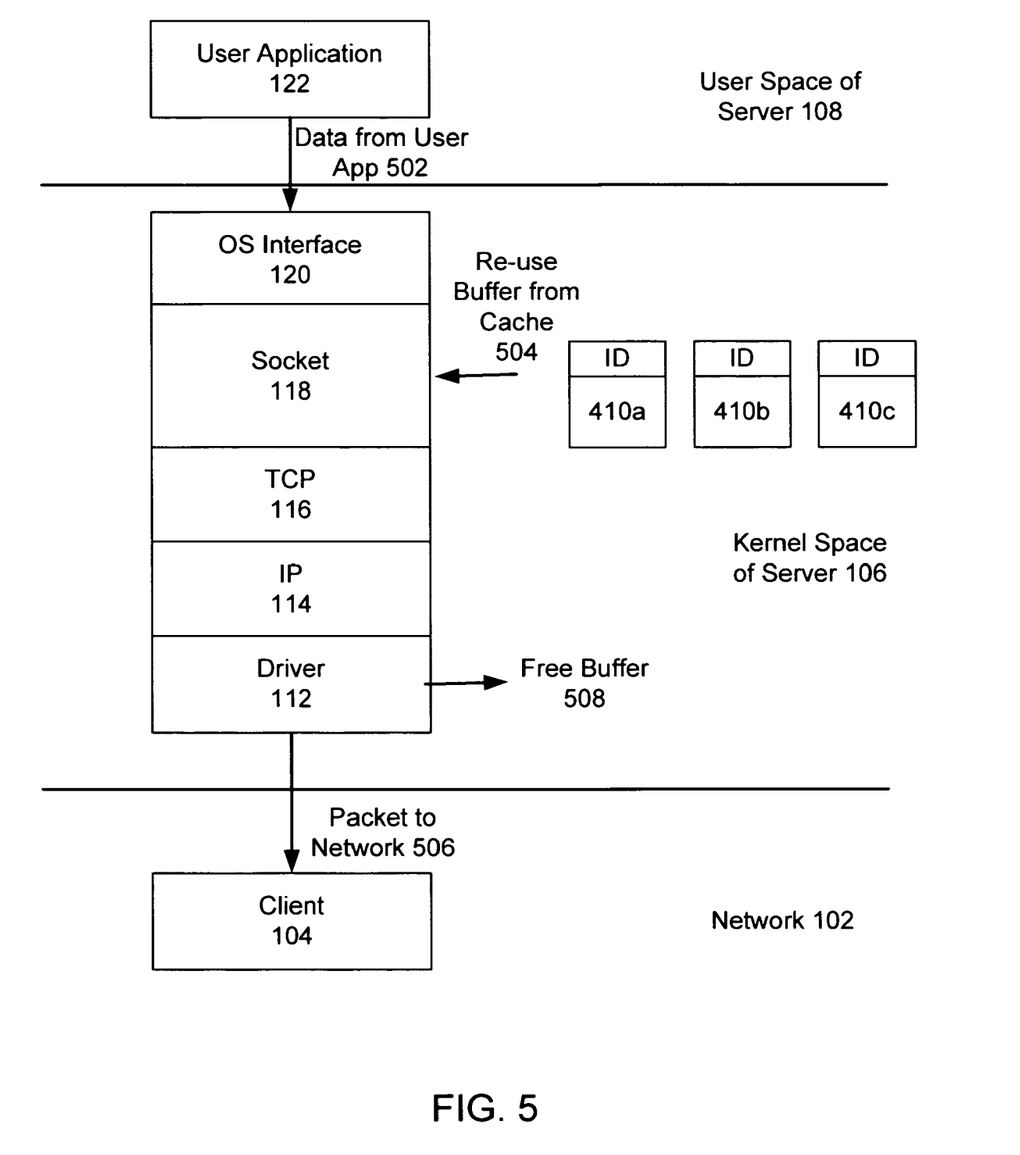
FIG. 5 is a schematic diagram depicting select steps in the processing of reply data received from a user application by the network stack in accordance with an embodiment of the invention.

FIG. 5 is a schematic diagram depicting select steps in the processing of reply data received from a user application by the network stack in accordance with an embodiment of the invention. In particular, FIG. 5 shows processing steps in the outbound (send) path, wherein previously cached network buffers are re-used to improve transaction-related performance.

As shown, reply data from an application 122 in user space 108 of the server is received 502 at the top of the stack 110 by the OS interface 120. Here, the reply data is in response to a previously received request packet. As the reply data is processed by the stack 110, it conceptually moves down in the stack from the OS interface 120, to the socket layer 118, to the TCP layer 116, to the IP layer 114, and to the driver 112.

As the reply data is processed, a previously allocated buffer 410 is re-used 504 from the network buffer cache. In accordance with an embodiment of the invention, the particular buffer which is re-used 504 is the buffer that is associated with that particular transaction. In other words, the buffer allocated 404 for a request is re-used 504 for the corresponding reply.

As shown, the buffer re-use 504 in the outgoing path is typically performed by the socket layer 118. Thereafter, the packet data in the buffer is further processed by the networking subsystem and is then sent to the driver 112 of the network interface for transfer 506 in a data packet via the network 102 to the client 104.

When the network buffer is no longer needed, the network subsystem frees 508 the network buffer (which was originally allocated 404 during the inbound path of the request packet). As shown, the freeing 508 of the buffer in the outgoing path is typically performed by the driver layer 112. After being freed, the buffer memory is available to be re-allocated for processing other incoming or outgoing data.

In accordance with an embodiment of the invention, there may be a time-out mechanism for the network buffers in the network buffer cache. In other words, a network buffer may be allowed to reside in the network cache for only a limited time period. At the end of the allowed time period, the network buffer may be removed from the network cache. This feature advantageously prevents the network buffer cache from becoming filled with network buffers that are not being re-used within a reasonable amount of time which is determined by the allowed time period.

Figure 6:
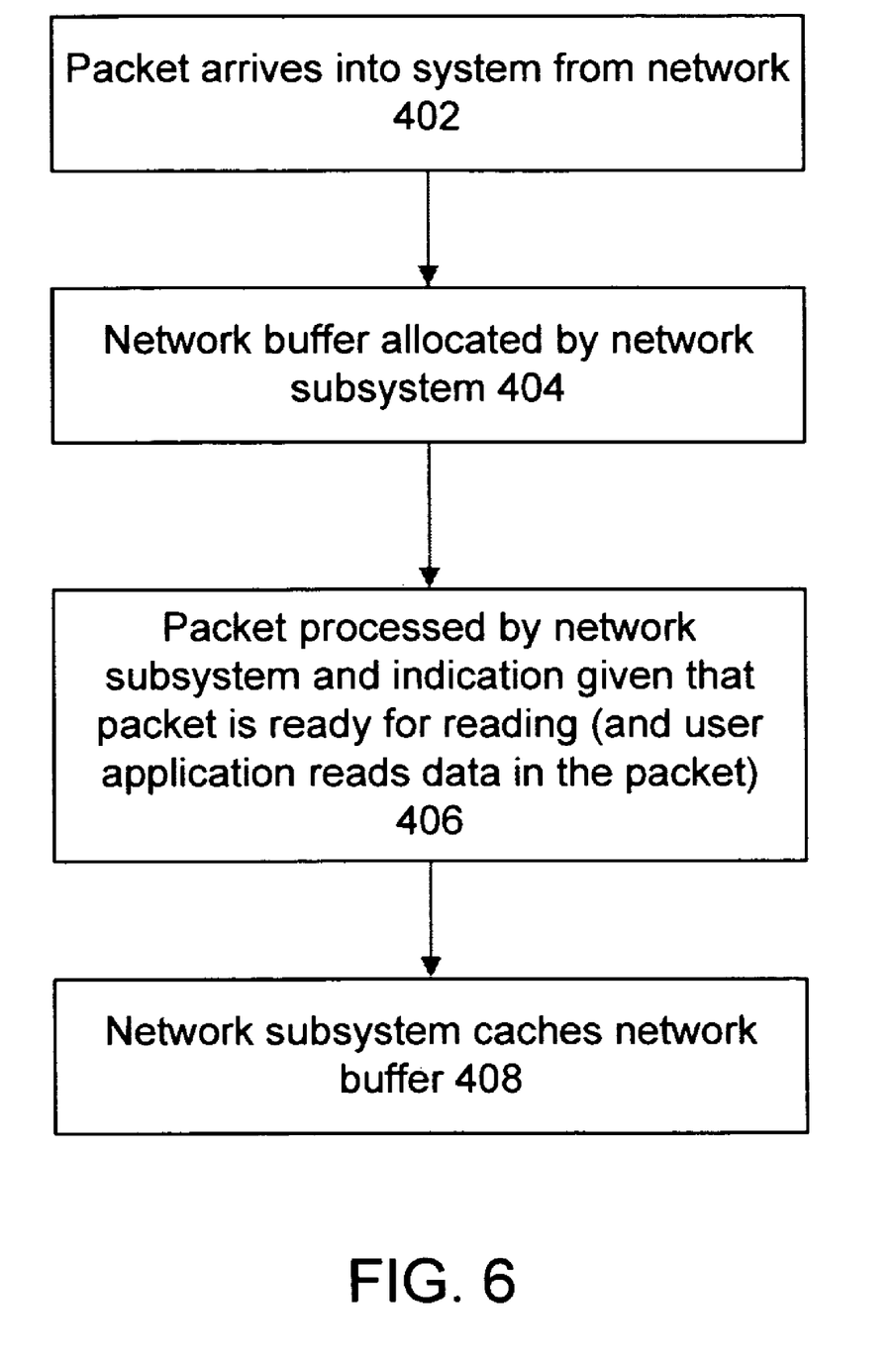
FIG. 6 is a flow chart summarizing select steps in the processing of a data packet received from a client by the network stack in accordance with an embodiment of the invention.
Figure 7:
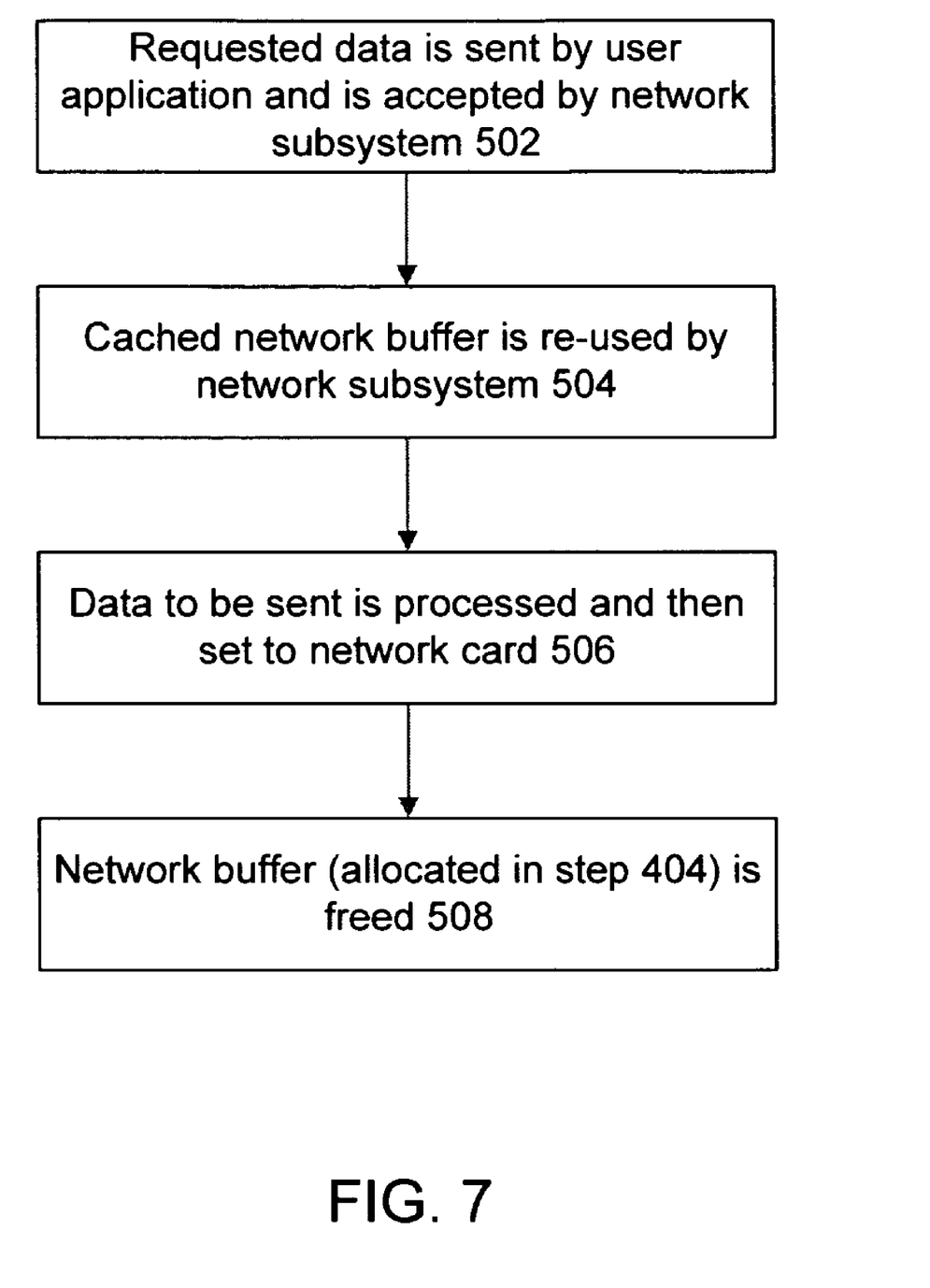
FIG. 7 is a flow chart summarizing select steps in the processing of reply data received from a user application by the network stack in accordance with an embodiment of the invention.

FIG. 6 is a flow chart summarizing select steps in the processing of a data packet received from a client by the network stack in accordance with an embodiment of the invention. These steps are discussed above in relation to FIG. 4. FIG. 7 is a flow chart summarizing select steps in the processing of reply data received from a user application by the network stack in accordance with an embodiment of the invention. These steps are discussed above in relation to FIG. 5.

One advantageous aspect of the above-described technique is that, while it improves the performance of transaction-based applications (which utilize repeated iterations of request and respond packets), it has merely an insubstantial impact on the performance of inbound and outbound bulk data transfers (where a long sequence of packets is sent in one direction).

Measurement Results

Measurements performed in an actual system with a prototype shows an approximate 50% reduction in CPU utilization by functions which allocate and free network buffers (the "allocb" and "freeb" functions, respectively). The service demand, which is a measure of time taken to complete one transaction, was reduced by 4.4%. The transaction throughput, which is a measure of the number of transactions done per second, improved by 0.68%.

Alternate Embodiment

The above discussion relates to transactions initiated with an inbound request packet, and then completed with an outbound response packet. However, in accordance with an alternate embodiment of the invention, network buffer caching may also be applied to transactions initiated with an outbound request packet, and then completed with an inbound response packet.

Figure 8:
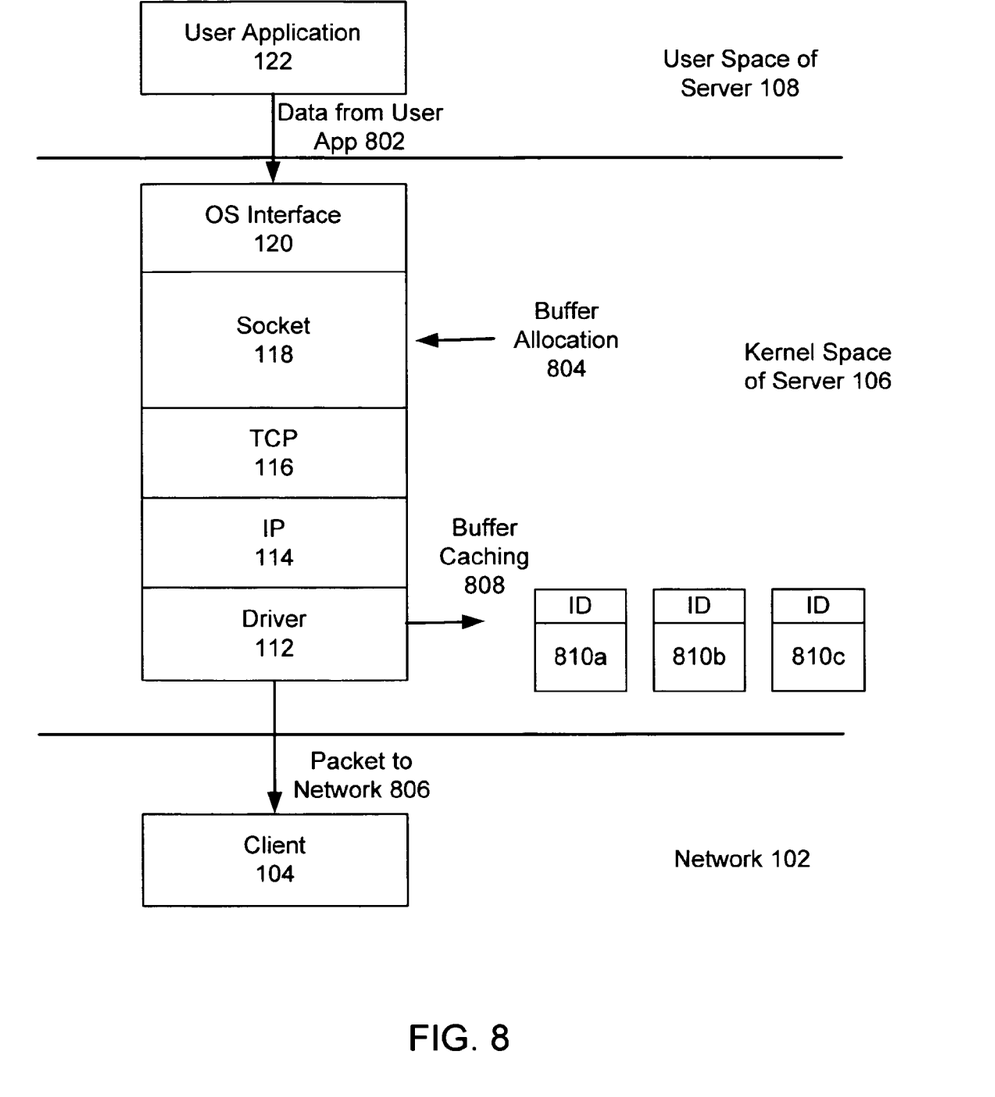
FIG. 8 is a schematic diagram depicting select steps in the processing of data received from a user application by the network stack in accordance with an alternate embodiment of the invention.

FIG. 8 is a schematic diagram depicting select steps in the processing of a data packet received from a user application by the network stack in accordance with an alternate embodiment of the invention. In particular, FIG. 8 shows processing steps in the outbound (send) path, wherein caching of network buffers is utilized to improve transaction-related performance.

As shown, data packet from an application 122 in user space 108 of the server is received 802 at the top of the stack 110 by the OS interface 120. Here, the data packet may comprise a packet which requests a response. As the data packet is processed by the stack 110, it conceptually moves down in the stack from the OS interface 120, to the socket layer 118, to the TCP layer 116, to the IP layer 114, and to the driver 112.

A network buffer is allocated 804 by the networking subsystem to copy the packet for further network processing. As shown, the buffer allocation 804 in the outgoing path may be performed by the socket layer 118. Thereafter, the packet data in the buffer is further processed by the networking subsystem and is then sent to the driver 112 of the network interface for transfer 806 in a data packet via the network 102 to the client 104.

In accordance with the process of FIG. 8, the buffer is not freed at this point. Instead, the buffer is cached 808 by the network subsystem. In other words, the memory previously allocated to the buffer remains allocated. This caching may be performed, for example, by the driver layer 112. In accordance with an embodiment of the invention, each memory buffer 810 in the cache is tagged or otherwise associated with a unique (or highly likely to be unique) transaction identifier (ID). For illustrative purposes, three network buffers (810a, 810b, and 810c) are shown in FIG. 8, each network buffer having an associated transaction identifier (ID).

The network buffer cache may be configured so as to be able to hold a limited number of network buffers, where each network buffer may be sized to be able to hold a typical data packet (sized at 1024 bytes, for example). For example, the network buffer cache may be configured to hold a maximum of 4, 8, 16, 32, or 64 network buffers. As the maximum number of buffers in the cache increases, the number of transactions which may be efficiently processed at a same time for a user application increases.

In accordance with a preferred implementation, if the network buffer cache is full when a network buffer is supposed to be cached 808, then that network buffer is freed, rather than cached. This feature advantageously prevents the network buffer cache from significantly affecting bulk data transfers. For example, an outbound bulk data transfer would result in the network buffer cache filling up with the first several packets of the data transfer. The remaining transferred packets may then be processed by allocating and then freeing (for re-allocation) a small number of network buffers.

Figure 9:
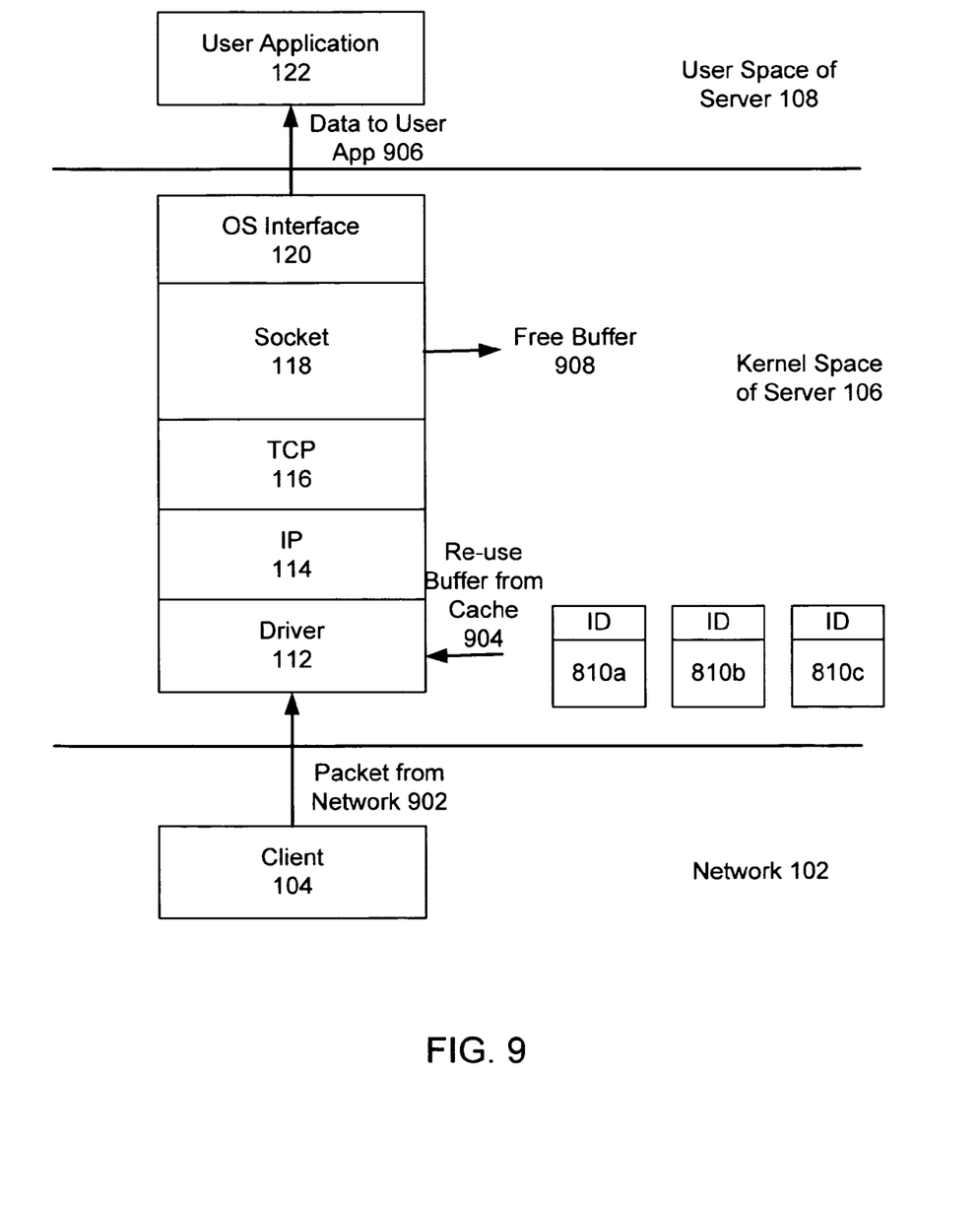
FIG. 9 is a schematic diagram depicting select steps in the processing of a reply packet received from a client by the network stack in accordance with an alternate embodiment of the invention.

FIG. 9 is a schematic diagram depicting select steps in the processing of a response packet received from a client by the network stack in accordance with an alternate embodiment of the invention. In particular, FIG. 9 shows processing steps in the inbound (receive) path, wherein previously cached network buffers are re-used to improve transaction-related performance As shown, a response packet from a client 104 in the network 102 arrives 902 at the network interface. The response packet is received by the driver 112 for the network interface and deposited in the system memory. As the packet is processed by the stack 110, it conceptually moves up in the stack 110 from the driver 112, to the IP layer 114, to the TCP layer 116, to the socket layer 118, to the OS interface 120.

As the response packet is processed, a previously allocated buffer 810 is re-used 904 from the network buffer cache. In accordance with an embodiment of the invention, the particular buffer which is re-used 904 is the buffer that is associated with that particular transaction. In other words, the buffer allocated 804 for a request is re-used 904 for the corresponding reply.

As shown, the buffer re-use 904 in the incoming path may be performed by the driver layer 112. Thereafter, the packet in the buffer is further processed by the networking subsystem, and the user application is then given an indication that the packet is ready for it to read. The user application then reads 906 the data in the packet.

When the network buffer is no longer needed, the network subsystem frees 908 the network buffer (which was originally allocated 804 during the outbound path of the request packet). As shown, the freeing 908 of the buffer in the inbound path may be performed at the socket layer 118. After being freed, the buffer memory is available to be re-allocated for processing other incoming or outgoing data.

In accordance with an embodiment of the invention, there may be a time-out mechanism for the network buffers in the network buffer cache. In other words, a network buffer may be allowed to reside in the network cache for only a limited time period. At the end of the allowed time period, the network buffer may be removed from the network cache. This feature advantageously prevents the network buffer cache from becoming filled with network buffers that are not being re-used within a reasonable amount of time which is determined by the allowed time period.

CONCLUSION

Applicant has discovered a problematic source of substantial inefficiency in at least some conventional network interfaces. This source of inefficiency relates to the repeated allocation and freeing of network buffers for transaction-based applications. Applicant has further found a solution to this problem which results in substantial performance improvement. The solution involves creating a network buffer cache and a procedure to re-use previously allocated network buffers using the cache. The solution advantageously improves performance of transaction-based network applications, with minimal or negligible impact on bulk data transfers.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of processing packets by a network stack, the method comprising:

receiving a request packet from a client via a network;

allocating a network buffer for the request packet and copying the request packet into the network buffer;

giving an indication that the request packet is ready for reading by an application; and retaining the network buffer in a buffer cache until response data associated with the request packet is received from the application;

re-using the retained network buffer by copying the response data into the retained network buffer; and freeing the network buffer after copying the response data therein and sending the response data:

wherein the request packet and the response data are each associated with a transaction identifier and the method further comprises associating the retained network buffer with the transaction identifier, and wherein the re-using step comprises selecting the retained buffer from the buffer cache based on a match between the transaction identifier associated with the request packet, the transaction identifier associated with the response data and the transaction identifier associated with the retained buffer.

2. The method of claim 1, wherein the network buffer is retained in a network buffer cache and further comprising, if the network buffer cache is flail, then, instead of re-using the network buffer, freeing the network buffer.

3. The method of claim 1, wherein the caching is performed at a socket layer.

4. The method of claim 1, wherein the re-using is responsive to the receipt of the request packet from the application.

5. The method of claim 1, wherein the retaining comprises retaining the network buffer in a network buffer cache, 6. The method of claim 1, wherein the retaining comprises retaining the network buffer in a network buffer cache that uses transaction identifiers as tags.

7. A method performed by a network stack using a network buffer cache, the network buffer cache comprising a plurality of network buffers, the method comprising:

receiving data from an application;

allocating a network buffer for the data and copying the data into the network buffer;

processing the data and sending the data in a request data packet to a client via a network;

adding the network buffer to the network buffer cache and retaining the network buffer in the network buffer cache until a response packet associated with the request packet is received from the client;

re-using one of the network buffers in the network buffer cache by copying the response packet into the one of the network buffers;

giving an indication that the response packet in the re-used network buffer is ready for reading by the application; and freeing the re-used network buffer after the indication;

wherein the request packet and the response packet are each associated with a transaction identifier, the method further comprising selecting the one of the network buffers in the network cache for re-use based on a match between the transaction identifier of the request packet and the transaction identifier of the response packet.

8. The method of claim 7, wherein re-using the network buffer includes removing the network buffer from the network buffer cache and does not include a re-allocation of the network buffer.

9. The method of claim 7, wherein the network buffer cache has a maximum capacity for network buffers.

10. The method of claim 7, wherein the network buffer is retained in a network buffer cache and further comprising, if the network buffer cache is full, then, instead of caching the network buffer, freeing the network buffer.

11. The method of claim 7, wherein the re-using is performed at by a device driver.

12. An apparatus configured to interface with a network, the apparatus comprising:
    a device driver configured to receive a request packet from a client via the network, to allocate a network buffer for the request packet, and to copy the request packet into the network buffer, wherein the request packet is associated with a transaction identifier;
    an operating system interface configured to give an indication that the request packet is ready for reading by an application; and
    a socket layer configured to retain the network buffer in a buffer cache instead of freeing the network buffer, after the indication, wherein the network buffer is retained in association with the transaction identifier, and to retrieve the network buffer from the buffer cache when response data is ready to be sent to the client, the retrieval based on a match between the transaction identifier associated with the request packet, a transaction identifier associated with the response data, and the transaction identifier associated with the network buffer.

13. The apparatus of claim 12, wherein the socket layer is further configured to retain the network buffer until response data associated with the request packet is received from the application, and to re-use the network buffer by copying the response data into the network buffer, and to free the network buffer after the copy.

14. The apparatus of claim 12, wherein the re-use is responsive to the receipt of the request packet from the application.

15. The apparatus of claim 12, wherein the socket layer is further configured to retain the network buffer in a network buffer cache.

16. An apparatus configured to interface with a network, the apparatus comprising:
    an operating system interface configured to receive data from an application;
    a socket layer configured to allocate a network buffer for the data and copy the data into the network buffer; and
    a device driver configured to send the data in a first data packet to a client via a network, to retain the network buffer until a response packet associated with the first data packet is received from the client, and to re-use the retained network buffer by copying the response packet into the retained network buffer,
    wherein the socket layer is further configured to give an indication that the response packet in the retained network buffer is ready for reading by the application,
    wherein the device driver is further configured to free the retained network buffer after the indication; and
    wherein the first data packet and the response packet are each associated with a transaction identifier, and wherein the network buffer, when retained, is retained in a buffer cache in association with the transaction identifier, and wherein the re-use comprises selecting the network buffer from the buffer cache based on a match between the transaction identifier associated with the first data packet, the response packet and the network buffer.

17. The apparatus of claim 16, wherein the re-use is responsive to the receipt of the response packet from the client.

18. The apparatus of claim 16, further comprising a network buffer cache, wherein the socket layer is further configured to retain the network buffer in the network buffer cache.

* * * * *

UNITED STATES PATENT AND TRADEMARK OFFICE
CERTIFICATE OF CORRECTION

PATENT NO. : 7,729,368 B2  Page 1 of 1
APPLICATION NO. : 11/655581
DATED : June 1, 2010
INVENTOR(S) : Rakesh Saha

It is certified that error appears in the above-identified patent and that said Letters Patent is hereby corrected as shown below:

In column 8, line 41, in Claim 2, delete "flail," and insert -- full, --, therefor.

In column 8, line 48, in Claim 5, delete "cache," and insert -- cache. --, therefor.

Signed and Sealed this

Twenty-first Day of December, 2010

David J. Kappos
*Director of the United States Patent and Trademark Office*